Patented May 8, 1951

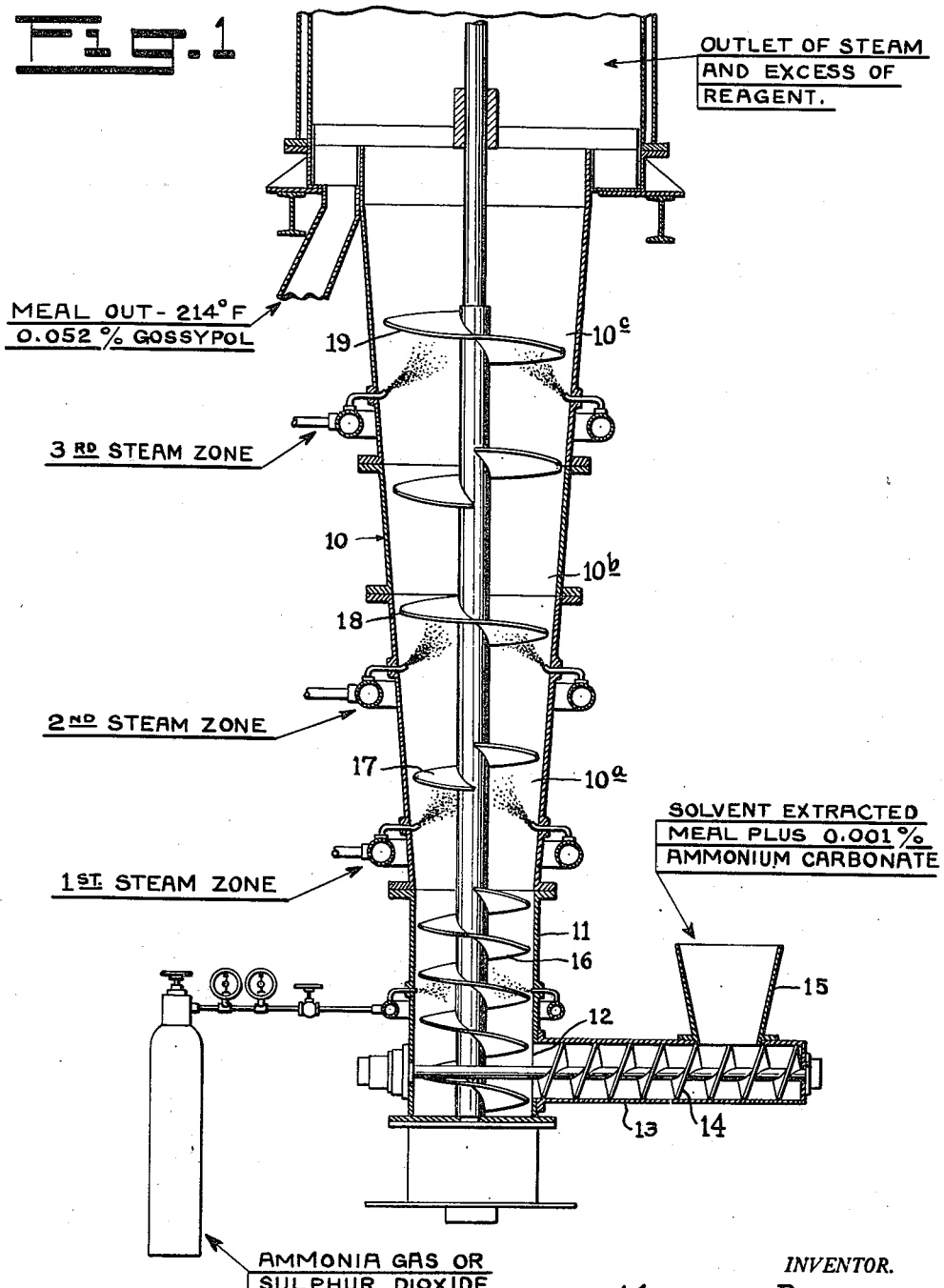

2,551,581

UNITED STATES PATENT OFFICE 2,551,581

PROCESS FOR TREATMENT OF GOSSYPOL IN SOLVENT-EXTRACTED COTTONSEED MEAL

Michele Bonotto, Princeton, N. J.

Application November 26, 1948, Serial No. 62,132

10 Claims. (Cl. 99—2)

This invention relates to improvements in process and apparatus for treatment of gossypol in solvent-extracted cottonseed meal.

It is well known in the cottonseed crushing industry that the toxic substance called "gossypol" contained in the cottonseed must be destroyed or altered or made innocuous in order to have the pressed or extracted meal suitable for feeding animals. When presses are used to remove the oil from cottonseed, the problem of dealing with gossypol is simplified because the gossypol is altered or destroyed or made innocuous during the pre-cooking of the crushed seeds prior to pressing. This cooking process conventionally is done in order to rupture the oil cells contained in the seeds to make them ready for pressing and to facilitate the free-flowing of the oil during the pressing operation. At the same time, as stated above, the greater portion of gossypol is destroyed or altered or made innocuous during this cooking process, thus making the residual meal suitable for animal consumption.

The gossypol is apparently affected not merely by the heat treatment employed in the cooking. An important factor seems to be the presence of moisture, controlled during the cooking process to around 16% to 18%. The duration of the so-called cooking also has an important function, as also has the presence of live steam in the mass. In the cottonseed crushing practice, the treatment or cooking of the crushed or flaked seed prior to pressing is carried on in specially designed stack cookers under the following average conditions: temperature, 230° to 250° F.; duration, from 70 to 90 minutes; initial moisture, from 16% to 18%, which moisture is gradually reduced until at the end of the cooking operation the moisture content of the material is between 8% to 10%.

When solvent is used instead of presses to extract the oil from cottonseed, the pre-cooking of the flaked or crushed seeds according to the above procedure has been found impractical because of the excessive amount of fine particles caused by the agitating devices of the cooker. Such fines impare the free-flowing of solvent throughout the mass of flaked seed in the extractor. In addition, such fines cause further complications because they are carried over with the miscella at the exit of the extraction apparatus to the solvent recovery system.

Attempts have been made to destroy or render gossypol innocuous by cooking the meal, in accordance with previously-described procedure, after it has been solvent extracted. Such solvent-extracted meal usually contains from 1% to 2½% of oil. However, the treatment of the gossypol by cooking after solvent extraction has, up to the present time, not been satisfactory because tests have shown that the initial gossypol content of solvent-extracted meal, which is around 0.9% on an 8% moisture basis, has only been reduced to 0.2%, and a meal in which the gossypol is so reduced is still not safe for feeding purposes.

Some success in reducing the gossypol content has been achieved in treating solvent-extracted meal in autoclaves at varying pressures but, again, the results have not been found satisfactory; neither from the point of view of the percent of gossypol left intact in the meal nor from the practical point of view with respect to processing on a large scale, especially in solvent plants operating on the continuous principle.

Objects of my invention are to reduce the percentage of gossypol in the solvent-extracted meal to an amount that is considered safe for animal food, as for example, less than 0.05%; to utilize for this purpose a chemical reagent of a type in which the excess may, during the process of reducing the gossypol content to a safe proportion, be readily eliminated or steamed out so as to avoid the necessity of using additional chemicals to neutralize such excess, which additional neutralizing chemicals always leave in the product chemical compounds resulting from such neutralization, and thus to produce a final product that is free from such chemical compounds as well as from such excess of the reagent; to provide a reagent and a process of applying the same by the use of which the said reagent may be thoroughly distributed throughout the mass of meal being treated; to utilize a process and to employ apparatus in and by which the above result may be accomplished in a commercial plant operating on the continuous-operation principle; to reduce the time of treatment over prior art treatments, and to reduce the average of the temperature of such treatments while in no way deleteriously affecting the food value or other feeding factors of the meal.

Another object of my invention is to utilize the reagent in gaseous form and to inject such gas in proper amount into the meal during a conveying movement thereof.

With these and other objects in view the invention comprises the combination of steps and members so combined as to coact and cooperate with each other in the performance of the functions and the accomplishment of the result herein contemplates, and the apparatus comprises, in one of its adaptations, the species or preferred form illustrated in the accompanying drawing in which—

Fig. 1 is an illustrative sectional view of apparatus similar to that shown in my said Patent No. 2,277,361 except for the introduction of a gaseous reagent.

In accordance with my invention, I have discovered that by a cooking or steaming operation of the solvent-extracted meal in the presence of ammonia vapors, I am enabled not only to reduce the percentage of gossypol in the meal to less than 0.05% (which amount is considered safe for animal consumption), but also to substantially reduce the time of the treatment, and to reduce the average temperature of the treatment, while in no way deleteriously affecting the food value of the meal.

I have also found that such a cooking or steaming operation carried on in the presence of $SO_2$ (sulphur-dioxide) will accomplish substantially the same results above specified.

My invention may be carried out in any conventional cooking apparatus known in the oilseed crushing industry, but I have obtained the best results by applying my invention in apparatus similar to my continuous solvent eliminator (also called dryer) described in my Patent No. 2,277,361 and by applying a process similar to that described in my Patent No. 2,191,255. My invention may also be carried on in apparatus similar to my patented apparatus, Patent No. 2,254,867, and in other forms of apparatus similar to apparatus on which I have patent applications now pending.

The advantages of using gaseous ammonia or gaseous $SO_2$ are, first, that the excess of the reagents is readily eliminated or steamed out during the process and, second, there is no necessity to use chemicals to neutralize such excess, so that the final product is free from chemical compounds resulting from such neutralization.

I have found that when processing solvent extracted cottonseed meal in apparatus similar to the apparatus of my Patent No. 2,277,361 mentioned above, the time of treatment is reduced from the conventional 70 to 90 minutes to about 30 to 40 minutes. In addition, the temperature of the treatment is reduced from the conventional 240° F. to 216° F. or lower, and the gossypol content from about 0.9% is reduced to about 0.05% or less (on an 8% moisture basis).

The steaming process, according to the preferred form of my invention, was in tests effected in the following way. (See Patent No. 2,277,361 for a detailed description of the apparatus used in my tests.) The solvent extracted meal containing approximately 1.03% oil, 8% moisture, and 45% protein, was continuously introduced into the bottom of the apparatus at a rate of 5.5 lbs. per minute at room temperature of 64° F. Into the meal entering the apparatus, from 0.001 to 0.002% ammonium carbonate $(NH_4)_2 CO_3, H_2O$ was continuously added in granular or lump form. That is, for each 2,500 grams of meal, 2.5 grams of ammonium carbonate were used—when the proportion was 0.001%.

In the accompanying illustrative drawing I have shown a vertically-disposed or upright tank 10 having between its ends a plurality, and as shown three, steam treating sections $10^a$—$10^b$—$10^c$, which is adapted to contain and be filled with solid extracted material and into and through which steam is admitted under suitable pressure. The tank is provided at the bottom portion thereof with a cylindrical section 11 also adapted to contain a body of material of sufficient length and density to prevent downward blowing therethrough of steam admitted to the treating sections hereinabove referred to. Adjacent to the bottom of the tank a feed opening 12 is provided through which process material is fed from a conduit 13 containing a conveyor feed screw 14, and, as shown, a feed hopper 15 for extracted meal is connected with the conduit 13. A conveyor screw 16 is mounted in the tank 10 and is adapted to convey upwardly through the cylindrical section 11 all solid materials fed at the bottom through the opening 12. Such solid material at the end of the conveyor screw 16 is forced still further upwardly successively into the varying steaming zones $10^a$—$10^b$—$10^c$ respectively, which are preferably free of conveying mechanism. Thus, the section $10^a$ communicates with the section $10^b$ and is preferably separated therefrom by a screw flight 17, while the section $10^c$ is separated from the section $10^b$ by a screw flight 18 and a screw flight 19 is preferably provided above the zone $10^c$. The solvent extracted meal plus 0.001% ammonium carbonate may be fed through the hopper 15 or, in the preferred form of my invention, the reagent may be fed into the lower section of the tank 10 in gaseous form from a tank of gaseous ammonia or sulphur dioxide 19.

It will be apparent that the apparatus shown in the accompanying drawing is similar in all respects to the apparatus shown and described in my said Patent #2,277,361 except for the means used for addition to the solvent extracted meal of either sulphur dioxide, or ammonium carbonate which may be added in dry form or in the form of a water solution before, after or during the passing of the material into and through the hopper 15, but preferably the agent or its equivalent is injected in gaseous or vapor form into the lower portion 11 of the tank 10 by the gas tank 19.

In said apparatus, three steaming zones are provided by blowing steam through three sets of jets, each set connected with a manifold. The duration of travel of the material, through the apparatus of the size used in my tests, at the above rate was about 38 minutes. Dry saturated steam at 130 lbs. pressure was expanderd to atmospheric pressure and introduced in the bottom manifold of the apparatus in such quantity so as to add moisture in the meal equal to about 15% to 18%.

When the mixture of meal and ammonium carbonate, which travels continuously upward, reaches the lower steaming zone of the apparatus, ammonia vapors are freed and the excess passes through the column of upwardly moving material under treatment, driven by the live steam which is going towards the upper exit of the apparatus. The column of material traveling, as stated before, upward in an atmosphere of steam and ammonia vapors, passes through the second steaming zone which is located above the first and is created by injecting superheated steam at a temperature of about 290° F. Then, it reaches a third steaming zone created by injecting steam, of the same quality as in the zone immediately below, through the manifold.

A sample of the meal so treated, taken after about 30 minutes of the treatment, showed a gossypol content of 0.054% and a sample taken at the exit of the apparatus after about 45 minutes of the treatment showed a gossypol content of 0.052%. The temperature of the meal at the exit was 214° F.

In other experiments with 0.002% of ammonium carbonate (or 5 grams for every 2,500 grams of meal), the gossypol content was further reduced to around 0.042% (8% moisture basis).

A maximum percent of gossypol in the meal, on an 8% moisture basis, of from 0.05% to 0.06% is considered not objectionable for feeding purposes.

If further reduction of the gossypol is desired, an increase in the proportion of the reagent to the meal under treatment and/or a longer period of treatment may be used.

Instead of ammonium carbonate, it is obvious that gaseous ammonia ($NH_3$) may be injected as illustrated in the drawing herewith at the base of the apparatus at the level of the entrance of the meal, in the amount corresponding to the proportions given. That is, the amount of gaseous ammonia must be equal to the amount of $NH_3$ developed by the ammonium carbonate under the above operating conditions and in the proportions given.

It is also obvious that my invention may be used with other forms of cooking apparatus or dryers without departing from my invention.

Under similar conditions sulphur-dioxide ($SO_2$) in gaseous form was injected into the bottom of a dryer such as hereinabove described at the inlet of the meal in proportions of from 0.00005% to 0.0002% of the meal under process, according to the quality of the original cottonseed and to the results desired. When 0.00015% proportion was used, the gossypol content was reduced to 0.037% on an 8% moisture basis and when 0.00007% proportion was used, the gossypol content was reduced to 0.053% on an 8% moisture basis.

The employment of the steaming zone $10^a$, in which the steam is condensed for the purpose of increasing the moisture content of the meal to the desired percentage, is preferred though not absolutely essential because water may be added to the meal before entering the apparatus and the moistened meal may be preheated to approximately 210° F. so as to avoid further condensation of steam during treatment of the meal in the superheated steam zones. My preferred procedure is, however, more economical because the necessary moisture is added during the operation of heating the meal in the said lower zone $10^a$.

Having described my invention, I claim:

1. A process for treatment of solvent-extracted cottonseed meal to reduce the gossypol content thereof to safe feeding proportions consisting in adding to the solvent-extracted meal ammonium carbonate in a proportion capable with moisture and heat of reducing the proportion of gossypol, and thereafter subjecting the meal to a steaming operation.

2. A process for treatment of solvent-extracted cottonseed meal to reduce the gossypol content thereof to safe feeding proportions consisting in adding to the solvent-extracted meal ammonium carbonate in a proportion capable with moisture and heat of reducing the proportion of gossypol, and thereafter subjecting the meal to a steaming operation during a conveying movement of the meal.

3. A process for treatment of solvent-extracted cottonseed meal to reduce the gossypol content thereof to safe feeding proportions consisting in adding in gaseous form during a conveying movement of the meal to the solvent-extracted meal ammonia vapors in a proportion capable with moisture and heat of reducing the proportion of gossypol, and thereafter subjecting the meal to a steaming operation during a conveying movement of the meal.

4. A process for treatment of solvent-extracted cottonseed meal to reduce the gossypol content thereof consisting in subjecting said solvent-extracted cotton seed meal to treatment with ammonia in a proportion capable with moisture and heat of reducing the proportion of gossypol, introducing into the solvent-extracted cottonseed meal moisture equal to approximately 18% of the meal, continuously moving a column of such solvent-extracted cottonseed meal in a substantially upward direction through a tank, then subjecting said moisture-containing meal in said tank to superheated steam injected into said column of material through said tank at a temperature between 260° and 350° F. and for a time period between thirty and sixty minutes, and thereafter discharging said treated meal and steam vapor from the said tank at a still higher level.

5. A process for treatment of solvent-extracted cottonseed meal to reduce the gossypol content thereof consisting in continuously moving a column of solvent-extracted cottonseed meal in a substantially upward direction through a tank, subjecting said solvent-extracted cottonseed meal to treatment with ammonia in a proportion capable with moisture and heat of reducing the proportion of gossypol, introducing into said column of meal through a lower portion of the tank steam expanded to atmospheric pressure in such quantity as to produce moisture in hot condition equal to approximately 18% of the meal, then subjecting said moisture-containing meal in said tank to superheated steam injected into said column of material through said tank at a level higher than that at which the moisture is introduced at a temperature between 260° F. and 350° F. and for a time period between thirty and sixty minutes, and thereafter discharging said treated meal and steam vapor from the said tank at a still higher level.

6. A process for treatment of solvent-extracted cottonseed meal to reduce the gossypol content thereof consisting in continuously moving a column of solvent-extracted cottonseed meal in a substantially upward direction through a tank, subjecting said solvent-extracted cottonseed meal to treatment with ammonia in a proportion capable with moisture and heat of reducing the proportion of gossypol, introducing into the meal at the bottom portion of the tank steam expanded to atmospheric pressure in such quantity as to produce moisture in hot condition equal to approximately 18% of the meal, then subjecting said moisture-containing meal in said tank to superheated steam injected into said column of material through said tank at a level higher than that at which the moisture is introduced at a temperature between 260° F. and 350° F., and then at a still higher level further subjecting said column of meal to superheated steam by injecting the same at substantially the same temperature as in the zone immediately below, and thereafter discharging said material and steam from said tank at a still higher level.

7. A process for treatment of solvent-extracted cottonseed meal to reduce the gossypol content thereof consisting in introducing into the meal, moisture equal to approximately 18% of the meal, continuously moving a column of such solvent-extracted cottonseed meal in a substantially upward direction through a tank, injecting through the bottom portion of the tank into said moistened column of meal ammonia vapor, then subjecting said moisture-containing meal in said tank to superheated steam injected at a temperature between 260° F. and 350° F. into said column of material through said tank at a level higher than that at which the ammonia vapor is introduced and for a time period between thirty and sixty minutes, and discharging said meal at a still higher level and also conjointly discharging any excess of said ammonia vapor and steam at a still higher level.

8. A process for treatment of solvent-extracted cottonseed meal to reduce the gossypol content thereof consisting in introducing into the meal moisture to approximately 18% of the meal, continuously moving a column of such solvent-extracted cottonseed meal in a substantially upward direction through a tank, injecting through the lower portion of the tank into said moistened column of meal a vaporous chemical agent comprising ammonia vapors equivalent to from 0.001% to 0.002% of ammonium carbonate, then subjecting said moisture-containing meal in said tank to superheated steam injected into said column of material through said tank at a level higher than that at which the moisture is introduced at a temperature between 260° F. and 350° F. and for a time period between thirty and sixty minutes, and discharging said meal at a still higher level and also conjointly discharging the excess of said vaporous chemical agent and steam at a still higher level.

9. A process for treatment of solvent-extracted cottonseed meal to reduce the gossypol content thereof to safe feeding proportions consisting in subjecting the solvent-extracted meal to treatment with ammonia in a proportion capable with moisture and heat of reducing the proportion of gossypol, and also subjecting the meal to moisture and heat.

10. A process for treatment of solvent-extracted cottonseed meal to reduce the gossypol content thereof to safe feeding proportions consisting in subjecting the solvent-extracted meal during a conveying movement thereof to treatment with ammonia vapors in a proportion capable with moisture and heat of reducing the proportion of gossypol, and also during such conveying movement subjecting the meal to moisture and heat.

MICHELE BONOTTO.

REFERENCES CITED

The following references are of record in the file of this patent:

UNITED STATES PATENTS

| Number | Name | Date |
|---|---|---|
| 526,689 | Davis | Oct. 2, 1894 |
| 1,553,634 | Sawyer | Sept. 15, 1925 |
| 2,064,158 | Harrell | Dec. 15, 1936 |
| 2,162,729 | Levinson | June 30, 1939 |
| 2,316,014 | Olcott | Apr. 6, 1943 |